May 13, 1958 F. W. DENISON, JR., ET AL 2,834,714
CULTURE PROCESS FOR ERYTHROMYCIN B
Filed March 1, 1954
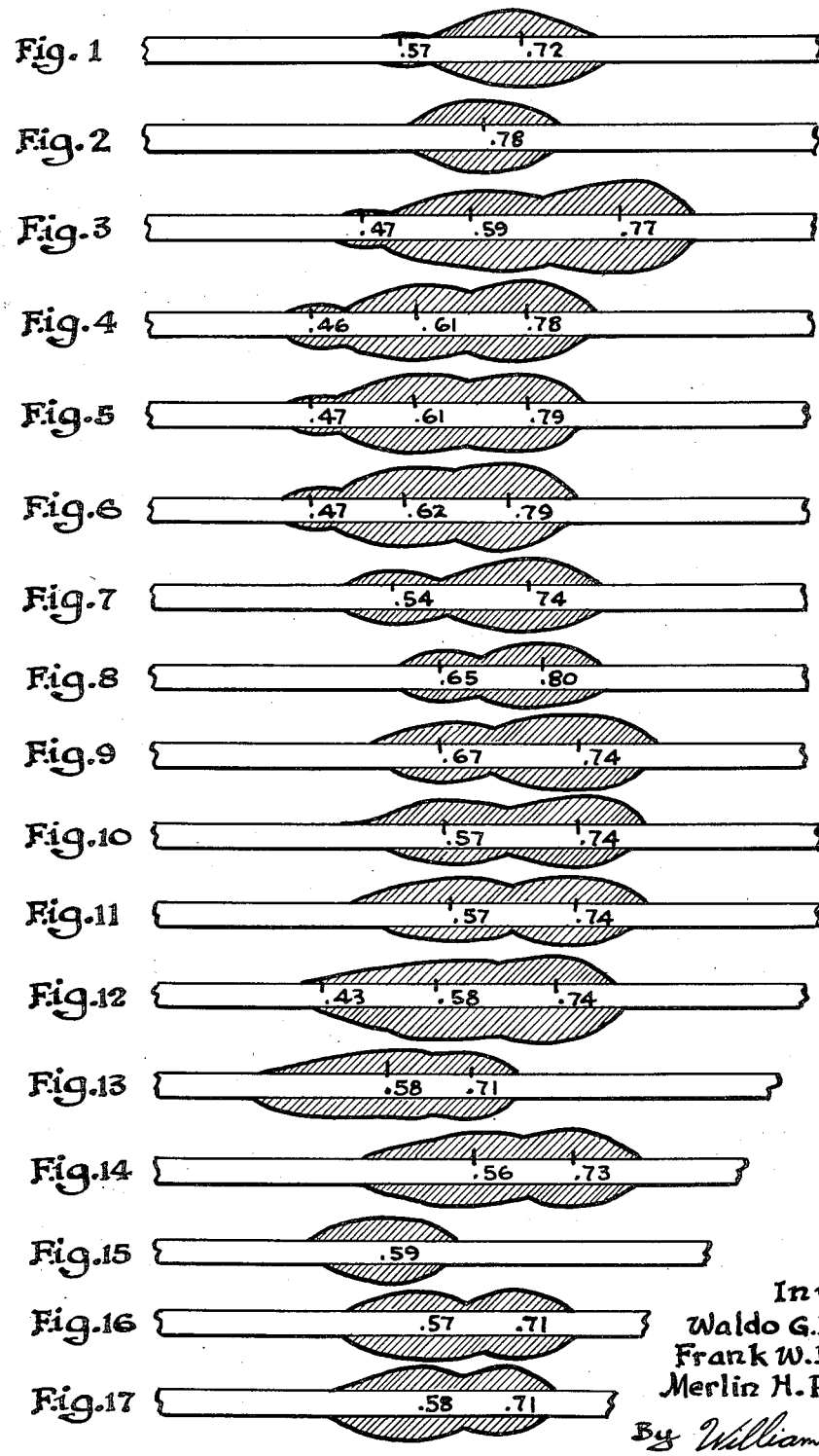
Inventors
Waldo G. Friedland
Frank W. Denison, Jr.
Merlin H. Peterson
By William E. Dominick
Attorney United States Patent Office 2,834,714
Patented May 13, 1958

2,834,714

CULTURE PROCESS FOR ERYTHROMYCIN B

Frank W. Denison, Jr., Lake Bluff, and Waldo C. Friedland and Merlin H. Peterson, Waukegan, Ill., assignors to Abbott Laboratories, North Chicago, Ill., a corporation of Illinois Application March 1, 1954, Serial No. 413,402

12 Claims. (Cl. 195—80)

The present invention relates to a method of producing the antibiotic erythromycin and more particularly to an improved method of producing substantially increased yields of erythromycin B.

Erythromycin is an antibiotic obtained by culturing a strain of Streptomyces erythreus in a culture medium containing an assimilable amount of carbohydrates, nitrogen, and inorganic salts and recovering the erythromycin antibiotic from the culture medium. It has heretofore been found that the erythromycin antibiotic produced by the organism Streptomyces erythreus in a deep culture fermentation process may comprise a mixture of several closely related antibiotic materials which have, for convenience, been identified as erythromycin A, erythromycin B and erythromycin C. The presence of the foregoing individual erythromycin components is readily determined by well-known paper strip chromatographic techniques.

The antibiotic erythromycin B, like erythromycin A which was originally thought to comprise the only erythromycin antibiotic substance produced by the deep culture fermentation of Streptomyces erythreus, possesses antibiotic activity against many organisms, both gram positive and gram negative. Erythrmycin B is readily distinguishable from erythromycin A, however, by being substantially more stable in acidic media and in this respect is preferable to erythromycin A since in the normal processing procedures and in therapeutic use substantial amounts of erythromycin A are destroyed as a result of being exposed to acidic conditions. The antibiotic properties of erythromycin B together with its low toxicity and increased stability make erythromycin B of great utility as a therapeutic agent in the treatment of many diseases.

It is, therefore, an object of the present invention to provide an improved method of producing erythromycin B.

It is also an object of the present invention to provide an improved method of obtaining substantial amounts of erythromycin B by the deep culture fermentation of Streptomyces erythreus.

It is a further object of the present invention to provide an improved nutrient medium for the deep culture fermentation of an erythromycin B producing strain of Streptomyces erythreus.

It is a still further object of the present invention to provide an improved method of producing substantially increased yields of erythromycin.

Other objects of the invention will be apparent from the detailed description and claims to follow.

It has been discovered that in the deep culture fermentation of an erythromycin producing strain of Streptomyces erythreus in a culture medium containing an assimilable source of carbohydrates, nitrogen, and inorganic salts wherein the nitrogen content of the culture medium is approximately 1.3 mg./ml. of culture medium or less, no detectable amount of erythromycin B is produced. It has also been discovered, however, that when the organism Streptomyces erythreus is subjected to deep culture fermentation in the presence of a nutrient medium containing nitrogenous material in an amount which produces a nitrogen level substantially above 1.3 mg. of nitrogen per ml. of culture medium significant amounts of erythromycin B are produced. Thus, when the organism Streptomyces erythreus is subjected to deep culture fermentation in a nutrient medium containing about 1.6 and 2.2 mg. nitrogen per ml. culture medium, appreciable amounts of erythromycin B are produced; and, when the nitrogen content of the medium is between 2.5 and 3.5 mg. nitrogen per ml. culture medium, the erythromycin B is produced in substantial amounts equal to or greater than the amount of erythromycin A produced, with minor amounts of erythromycin C also being present in the culture medium. And, when the nitrogen content of the culture medium is between 3.5 and 4.5 mg. nitrogen per ml. culture medium, an increased proportion of erythromycin B is produced in addition to erythromycin A but with substantially no erythromycin C being produced in the fermentation medium. Thus, a means has been found for effecting the production of substantial amounts of erythromycin B by regulating the nitrogen content of the culture medium; and within the experimental limits it has been found that the percentage of erythromycin B of the total erythromycin produced in the instant culture fermentation medium is directly proportional to the initial nitrogen level of the fermentation medium within the above specified range.

In the present invention any standard procedure can be employed for the deep culture fermentation of the nutrient media containing any of the erythromycin producing organisms, such as those set forth in U. S. Patent 2,653,899. Accordingly, it is possible to use the conventional deep culture fermentation equipment and any suitable fermentation media containing an assimilable source of carbohydrates, inorganic salts, and an organic or inorganic source of nitrogen to provide a nitrogen content as specified herein. The usual aseptic techniques and rates of flow of air through the fermentation medium are likewise used.

The present invention is illustrated as applied to the fermentation of erythromycin producing organisms in a nutrient medium containing, in addition to assimilable carbohydrates, nitrogenous material, and inorganic salts, a quantity of lipids, such as the naturally occurring fats and oils of animal and vegetable origin, although the synthetic fats and oils are also useful. Thus, for example, caloric fats and oils which have been found useful in conjunction with the present invention as an additional source of carbon, are lard oil, corn oil, soy bean oil, cottonseed oil, sesame oil, olive oil, coconut oil, margarine oil, and glycerol trioleate. All of the foregoing caloric fats can be added to the nutrient medium prior to inoculation with the organism or the fat can be added intermittently during the fermentation cycle. It should be understood that the present invention is not limited to nutrient media containing lipids; but since lipids have a beneficial effect on the overall erythromycin production in the media, it is preferable to also employ a caloric fat in the manner described.

The following specific examples are set forth for the purpose of illustrating the present invention but should not be construed to limit the invention to the particular ingredients or proportions disclosed.

Example I

An aqueous fermentation culture medium (12 liters) having a nitrogen content of about 1.55 mg./ml. and adjusted to pH 6.0 is prepared containing the following ingredients:

|  | G/l. |
|---|---|
| Starch | 15 |
| Soy bean meal grits | 15 |
| Corn steep solids | 2.5 |
| Calcium carbonate | 1.0 |
| Lard oil | 30 |

The culture medium having the foregoing composition is sterilized at a temperature of 121° C. for a period of 75 minutes. Thereafter the sterile culture medium is inoculated with 4% by volume of a 72-hour vegetative aerated bottle culture of *Streptomyces erythreus* (Waksman), NRRL 2338, and the inoculated medium is fermented in a 30 liter fermenter at a temperature of 32° C., while aerating at a rate of 0.80 vol./vol./minute and agitating at a rate of 480 R. P. M. for a period of 162 hours.

The distribution of the erythromycin products produced in the above fermentation process is shown in Figure 1 of the drawings wherein the paper chromatography strip using 0.01 N ammonium hydroxide saturated with methyl isobutyl ketone identifies the presence of erythromycin A which has an Rf of .72 and erythromycin B which has an Rf of .57. The foregoing paper chromatography strip can be compared with the said paper chromatography strip of the control sample shown in Figure 2 of the drawings wherein the culture medium used is the same as that in the foregoing example but with only 10 g./l. of soy bean meal grits present therein (1.15 mg. nitrogen per ml. culture medium).

Example II

An aqueous fermentation culture medium (12 liters) having a nitrogen content of about 2.75 mg./ml. and adjusted to pH 6.0 is prepared containing the following ingredients:

|  | G/l. |
|---|---|
| Starch | 15 |
| Soy bean meal grits | 30 |
| Corn steep solids | 2.5 |
| Calcium carbonate | 1.0 |
| Lard oil | 30 |

The culture medium having the foregoing composition is sterilized at a temperature of 121° C. for a period of 75 minutes. Thereafter the sterile culture medium is inoculated with 4% by volume of a 72-hour vegetative aerated bottle culture of *Streptomyces erythreus* (Waksman), NRRL 2338, and the inoculated medium is fermented in a 30 liter fermenter at a temperature of 32° C., while aerating at a rate of 0.80 vol./vol./minute and agitating at a rate of 480 R. P. M. for a period of 162 hours.

The distribution of the erythromycin products produced in the above fermentation process is shown in Figure 3 of the drawings wherein the paper chromatography strip using 0.01 N ammonium hydroxide saturated with methyl isobutyl ketone identifies the presence of erythromycin A which has an Rf of .77 and erythromycin B having an Rf of .59 in addition to smaller amounts of erythromycin C having an Rf of .47.

Example III

An aqueous fermentation culture medium having a nitrogen content of about 2.75 mg./ml. and adjusted to pH 6.0 is prepared containing the following ingredients:

|  | G/l. |
|---|---|
| Starch | 15 |
| Soy bean meal grits | 30 |
| Corn steep solids | 2.5 |
| Sodium chloride | 5.0 |
| Calcium carbonate | 1.0 |
| Cottonseed oil | 30 |

The culture medium having the foregoing composition and having a volume of approximately 30 gallons is sterlized at a temperature of 124° C. for a period of 45 minutes. Thereafter the sterile culture medium is inoculated with 10% by volume of a 44-hour vegetative seed fermentation culture of *Streptomyces erythreus* (Waksman), NRRL 2338, and the inoculated medium is fermented in a 50 gallon fermenter at a temperature of 33° C., while aerating at a rate of 1.0 vol./vol./minute and agitating at a rate of 250 R. P. M. for a period of 140 hours.

The distribution of the erythromycin products produced in the above fermentation process is shown in Figure 4 of the drawings wherein the paper chromatography strip using 0.01 N ammonium hydroxide saturated with methyl isobutyl ketone identifies the presence of erythromycin A which has a Rf of .78 and erythromycin B having an Rf of .61 along with a small amount of erythromycin C having an Rf of .46.

Example IV

An aqueous fermentation culture medium having a nitrogen content of about 3.07 mg./ml. and adjusted to pH 6.0 is prepared containing the following ingredients:

|  | G/l. |
|---|---|
| Starch | 15 |
| Soy bean meal grits | 10 |
| Cottonseed flour | 20 |
| Corn steep solids | 2.5 |
| Sodium chloride | 5.0 |
| Calcium carbonate | 1.0 |
| Corn oil | 30 |

The culture medium having the foregoing composition and having a volume of approximately 30 gallons is sterilized at a temperature of 124° C. for a period of 45 minutes. Thereafter the sterile culture medium is inoculated with 10% by volume of a 44-hour vegetative seed fermentation culture of *Streptomyces erythreus* (Waksman), NRRL 2338, and the inoculated medium is fermented in a 50 gallon fermenter at a temperature of 33° C., while aerating at a rate of 1.0 vol./vol./minute and agitating at a rate of 250 R. P. M. for a period of 140 hours.

The distribution of the erythrmycin products produced in the above fermentation process is shown in Figure 5 of the drawings wherein the paper chromatography strip using 0.01 N ammonium hydroxide saturated with methyl isobutyl ketone identifies the presence of erythromycin A which has an Rf of .79 and erythromycin B having an Rf of .61 and a small amount of erythromycin C having an Rf of .47.

Example V

An aqueous fermentation culture medium having a nitrogen content of about 3.23 mg./ml. and adjusted to pH 6.0 is prepared containing the following ingredients:

| | G./l. |
|---|---|
| Starch | 15 |
| Cottonseed flour | 30 |
| Corn steep solids | 2.5 |
| Sodium chloride | 5.0 |
| Calcium carbonate | 1.0 |
| Lard oil | 30 |

The culture medium having the foregoing composition and having a volume of approximately 30 gallons is sterilized at a temperature of 124° C. for a period of 45 minutes. Thereafter the sterile culture medium is inoculated with 10% by volume of a 44-hour vegetative seed fermentation culture of *Streptomyces erythreus* (Waksman), NRRL 2338, and the inoculated medium is fermented in a 50 gallon fermenter at a temperature of 33° C., while aerating at a rate of 1.0 vol./vol./minute and agitating at a rate of 250 R. P. M. for a period of 140 hours.

The distribution of the erythromycin products produced in the above fermentation process is shown in Figure 6 of the drawings wherein the paper chromatography strip using 0.10 N ammonium hydroxide saturated with methyl isobutyl ketone identifies the presence of erythromycin A which has an R$f$ of .78, erythromycin B having an R$f$ of .62 and smaller amounts of erythromycin C having an R$f$ of .47.

*Example VI*

An aqueous fermentation culture medium having a nitrogen content of about 1.95 mg./ml. and adjusted to pH 6.0 is prepared containing the following ingredients:

| | G./l. |
|---|---|
| Starch | 15 |
| Soy bean meal grits | 10 |
| Peptone | 5 |
| Corn steep solids | 2.5 |
| Calcium carbonate | 1.0 |
| Soy bean oil | 30 |

The culture medium having the foregoing composition and having the volume of approximately 12 liters is sterilized at a temperature of 121° C. for a period of 75 minutes. Thereafter the sterile culture medium is inoculated with 4% by volume of a 72-hour vegetative aerated bottle culture of *Streptomyces erythreus* (Waksman), NRRL 2338, and the inoculated medium is fermented in a 30 liter fermenter at a temperature of 32° C., while aerating at a rate of 0.80 vol./vol./minute and agitating at a rate of 480 R. P. M. for a period of 162 hours.

The distribution of the erythromycin products produced in the above fermentation process is shown in Figure 7 of the drawings wherein the paper chromatography strip using 0.01 N ammonium hydroxide saturated with methyl isobutyl ketone identifies the presence of erythromycin A which has an R$f$ of .74 and erythromycin B having an R$f$ of .54.

*Example VII*

An aqueous fermentation culture medium having a nitrogen content of about 1.57 mg./ml. and adjusted to pH 6.0 is prepared containing the following ingredients:

| | G./l. |
|---|---|
| Starch | 15 |
| Soy bean meal grits | 10 |
| Ammonium sulfate | 2 |
| Corn steep solids | 2.5 |
| Calcium carbonate | 1 |
| Cottonseed oil | 30 |

The culture medium having the foregoing composition and having the volume of approximately 12 liters is sterilized at a temperature of 121° C. for a period of 45 minutes. Thereafter the sterile culture medium is inoculated with 4% by volume of a 72-hour vegetative aerated bottle culture of *Streptomyces erythreus* (Waksman), NRRL 2338, and the inoculated medium is fermented in a 30 liter fermenter at a temperature of 32° C., while aerating at a rate of 0.80 vol./vol./minute and agitating at a rate of 480 R. P. M. for a period of 162 hours.

The distribution of the erythromycin products produced in the above fermentation is shown in Figure 8 of the drawings wherein the paper chromatography strip using 0.01 N ammonium hydroxide saturated with methyl isobutyl ketone identifies the presence of erythromycin A which has an R$f$ of .80 and erythromycin B having an R$f$ of .65.

*Example VIII*

An aqueous fermentation culture medium having a nitrogen content of about 2.11 mg./ml. and adjusted to pH 6.0 is prepared containing the following ingredients:

| | G./l. |
|---|---|
| Starch | 15 |
| Soy bean meal grits | 10 |
| Cottonseed flour | 10 |
| Corn steep solids | 2.5 |
| Sodium chloride | 5.0 |
| Calcium carbonate | 1.0 |
| Corn oil | 30 |

The culture medium having the foregoing composition and having a volume of approximately 30 gallons is sterilized at a temperature of 124° C. for a period of 45 minutes. Thereafter the sterile culture medium is inoculated with 10% by volume of a 44-hour vegetative seed fermentation culture of *Streptomyces erythreus* (Waksman), NRRL 2338, and the inoculated medium is fermented in a 50 gallon fermenter at a temperature of 33° C., while aerating at a rate of 1.0 vol./vol./minute and agitating at a rate of 250 R. P. M. for a period of 140 hours.

The distribution of the erythromycin products produced in the above fermentation process is shown in Figure 9 of the drawing wherein the paper chromatography strip using 0.01 N ammonium hydroxide saturated with methyl isobutyl ketone identifies the presence of erythromycin A which has an R$f$ of .74 and erythromycin B having an R$f$ of .67.

*Example IX*

An aqueous fermentation culture medium having a nitrogen content of about 3.55 mg./ml. and adjusted to pH 6.0 is prepared containing the following ingredients:

| | G./l. |
|---|---|
| Starch | 15.0 |
| Soy bean meal grits | 40.0 |
| Corn steep solids | 2.5 |
| Calcium carbonate | 1.0 |
| Cottonseed oil | 30.0 |

The culture medium having the foregoing composition and having a volume of approximately 12 liters is sterilized at a temperature of 121° C. for a period of 75 minutes. Thereafter the sterile culture medium is inoculated with 4% by volume of a 72-hour vegetative aerated bottle culture of *Streptomyces erythreus* (Waksman), NRRL 2338, and the inoculated medium is fermented in a 30 liter fermenter at a temperature of 32° C. while aerating at a rate of 0.80 vol./vol./minute and agitating at a rate of 480 R. P. M. for a period of 162 hours.

The distribution of the erythromycin products produced in the above fermentation process is shown in Figure 10 of the drawings wherein the paper chromatography strip using 0.01 N ammonium hydroxide saturated with methyl isobutyl ketone identifies the presence of erythromycin A which has an R$f$ of .74 and erythromycin B which has an R$f$ of .57. There is no erythromycin C found in the culture medium.

Example X

An aqueous fermentation culture medium having a nitrogen content of about 4.35 mg./ml. and adjusted to pH 6.0 is prepared containing the following ingredients:

| | G./l. |
|---|---|
| Starch | 15.0 |
| Soy bean meal grits | 50.0 |
| Corn steep solids | 2.5 |
| Calcium carbonate | 1.0 |
| Cottonseed oil | 30.0 |

The culture medium having the foregoing composition and having a volume of approximately 12 liters is sterilized at a temperature of 121° C. for a period of 75 minutes. Thereafter the sterile culture medium is inoculated with 4% by volume of a 72-hour vegetative aerated bottle culture of *Streptomyces erythreus* (Waksman), NRRL 2338, and the inoculated medium is fermented in a 30 liter fermenter at a temperature of 32° C. while aerating at a rate of 0.80 vol./vol./minute and agitating at a rate of 480 R. P. M. for a period of 162 hours.

The distribution of the erythromycin products produced in the above fermentation process is shown in Figure 11 of the drawings wherein the paper chromatography strip using 0.01 N ammonium hydroxide saturated with methyl isobutyl ketone identifies the presence of erythromycin A which has an $Rf$ of .74 and erythromycin B which has an $Rf$ of .57. There is no erythromycin C found in the culture medium.

Example XI

An aqueous fermentation culture medium (300 gallons) having a nitrogen content of about 3.23 mg./ml. and adjusted to pH 6.0 is prepared containing the following ingredients:

| | G./l. |
|---|---|
| Starch | 15 |
| Cottonseed flour | 30 |
| Corn steep solids | 2.5 |
| Sodium chloride | 5.0 |
| Calcium carbonate | 1.0 |
| Lard oil | 45 |

The above culture medium is placed in a 400 gallon fermenter tank and is sterilized at a temperature of 124° C. for a period of 45 minutes. The sterile culture medium is then inoculated with 15 gallons of a 46-hour vegetative seed fermentation culture of *Streptomyces erythreus* (Waksman), NRRL 2338, and the inoculated medium is fermented at a temperature of 33° C., while aerating at a rate of 1.0 vol./vol./minute and agitating at a rate of 290 R. P.M. for a period of 140 hours.

The distribution of the several erythromycin products produced in the above fermentation process is shown in Figures 12, 13, and 14 which correspond to paper chromatography strips using 0.01 N ammonium hydroxide saturated with methyl isobutyl ketone taken at 92 hours, 116 hours, and 140 hours, respectively, during the fermentation process and which identify the presence of erythromycin A having an $Rf$. of approximately .73 and erythromycin B having an $Rf$ of approximately .58, and a very small trace of erythromycin C having an $Rf$ of approximately .43.

Example XII

An aqueous fermentation culture medium (300 gallons) having a nitrogen content of about 3.23 mg./ml. and adjusted to pH 6.0 is prepared containing the following ingredients:

| | G./l. |
|---|---|
| Starch | 15 |
| Cottonseed flour | 30 |
| Corn steep solids | 2.5 |
| Sodium chloride | 5 |
| Calcium carbonate | 1 |
| Lard oil | 45 |

The above culture medium is placed in a 400 gallon fermenter tank and is sterilized at a temperature of 124° C. for a period of 45 minutes. The sterile culture medium is then inoculated with 15 gallons of a 46-hour vegetative seed fermentation culture of *Streptomyces erythreus* (Waksman), NRRL 2338, and the inoculated medium is fermented at a temperature of 33° C., while aerating at a rate of 1.0 vol./vol./minute and agitating at a rate of 290 R. P. M. for a period of 140 hours.

The distribution of the erythromycin products produced in the above fermentation process is shown in Figure 16 which corresponds to a paper chromatography strip obtained when using 0.01 N ammonium hydroxide saturated with methyl isobutyl ketone and which identifies the presence of erythromycin A having an $Rf$ of 0.71 and a large amount of erythromycin B having an $Rf$ of 0.57. It is found that the fermentation broth contains about 65% by weight of erythromycin B.

Example XIII

An aqueous fermentation culture medium (300 gallons) having a nitrogen content of about 3.23 mg./ml. and adjusted to pH 6.0 is prepared containing the following ingredients:

| | G./l. |
|---|---|
| Starch | 15 |
| Cottonseed flour | 30 |
| Corn steep solids | 2.5 |
| Sodium chloride | 5 |
| Calcium carbonate | 1 |
| Lard oil | 45 |

The above culture medium is placed in a 400 gallon fermenter tank and is sterilized at a temperature of 124° C. for a period of 45 minutes. The sterile culture medium is then inoculated with 15 gallons of a 46-hour vegetative seed fermentation culture of *Streptomyces erythreus* (Waksman), NRRL 2338, and the inoculated medium is fermented at a temperature of 33° C., while aerating at a rate of 1.0 vol./vol./minute and agitating at a rate of 290 R. P. M. for a period of 140 hours.

The distribution of the erythromycin products produced in the above fermentation process is shown in Figure 17 which corresponds to a paper chromatography strip obtained when using 0.01 N ammonium hydroxide saturated with methyl isobutyl ketone and whch identifies the presence of erythromycin A having an $Rf$ of approximately 0.71 and a large amount of erythromycin B having an $Rf$ of 0.58. The fermentation broth is found to contain 58.1% by weight of erythromycin B.

To recover the erythromycin B in substantially pure form, the fermentation broth produced by the above fermentation process is adjusted to pH 9.5 to 10.5 with sodium hydroxide and is extracted with 20% by volume of amyl acetate. An aqueous acetic acid solution is then used to extract the erythromycin from the amyl acetate solution at a pH of between 5.0 and 6.5. Any traces of amyl acetate remaining are removed by vacuum distillation at neutral pH. The erythromycin is then salted into acetone at pH 10 and the erythromycin precipitated from the acetone solution by adding water thereto. The precipitated erythromycin containing both erythromycin A and erythromycin B along with very small traces of erythromycin C is dissolved in acetone and crystallized to produce an erythromycin product containing approximately 80% erythromycin B and 20% erythromycin A. The latter crude erythromycin B preparation is then dissolved in an aqueous solvent having a pH of about 1.4 and allowed to stand for approximately 40 minutes during which period substantially all of the erythromycin A is destroyed. The basic constituents of the said acid degraded material which includes the erythromycin B are precipitated from the aqueous solution by the addition of sodium hydroxide. The precipitate thus obtained is crystallized from a water-acetone solvent mixture and finally recrystallized from dry acetone. Substantially pure erythromycin B is recovered by removal of the acetone solvent.

The erythromycin B products produced in the foregoing examples exhibit a melting point of 201–203 degrees C. (uncorrected). The infrared absorption spectrum of a 5% chloroform solution of erythromycin B in a 0.09 mm. cell is similar to that of erythromycin A but is distinguishable therefrom by the presence of absorption bands at 7.52, 10.59, and 11.24 microns and by the absence of absorption bands at 7.43 and 10.45 microns which are present in the infrared absorption spectrum of erythromycin A. The ultraviolet absorption spectrum of a 1% ethanol solution of erythromycin B exhibits a coefficient of extinction $$E^{1\%}_{1cm.} = 0.492 \text{ at } 288 \text{ m}\mu$$

and the ultraviolet spectrophotometric assay fails to develop the ultraviolet absorption band at 270 m$\mu$ characteristic of erythromycin A. Erythromycin B exhibits a specific rotation of −94.5° at a temperature of 25° C. as a 2.5% ethanol solution. The paper chromatography strip of substantially pure erythromycin B as above produced and having an Rf of .59 is shown in Figure 15 of the drawings. The micro-analysis of erythromycin B shows 61.95% carbon, 9.82% hydrogen, 1.94% nitrogen, 26.29% oxygen (by diff.), and 12.37% C—CH$_3$.

Suitable sources of nitrogen for the fermentation process includes a wide variety of substances such as the amino acids, casein, both hydrolyzed and unhydrolyzed, fish meal, cottonseed flour, soy bean meal, meat extracts, liver cake, and various other nitrogenous substances of vegetable or animal origin. Chemicals such as urea, nitrates, and ammonium compounds may also be added to the nutrient media as a source of nitrogen. Corn steep liquor, because of the wide variety of substances contained therein, both organic and inorganic, has been found to be a valuable addition to the fermentation media. It is not possible, of course, because of the crude nature of many of these nitrogenous substances to specify definite proportions of the material to be added.

In common with most fermentation processes, the process of the present invention is conducted with a liquid medium containing certain inorganic salts such as phosphates. Among elements which may be desirable in small amounts are potassium, calcium, magnesium, sulfur, iron, and certain elements in traces. When using crude substances as a source of nitrogen or carbon, however, such as corn steep liquor, many of these elements are contained therein and need not be added to the medium.

As a carbon source, there may be used ordinary starch, the so-called soluble starches, and sugars such as sucrose, glucose, maltose, dextrose, or the like and other water soluble or partially water soluble carbohydrate substances such as sugar alcohols, etc. And, as previously indicated, a caloric fat is desirably incorporated in the culture medium, preferably in an amount between about 0.25% and 6.0% based on the volume of the culture medium.

Others may readily adapt the invention for use under various conditions of service, by employing one or more of the novel features disclosed or equivalents thereof. As at present advised with respect to the apparent scope of our invention, we desire to claim the following subject matter.

We claim:

1. A method of producing an erythromycin B-containing fermentation broth having a major proportion of erythromycin B therein which comprises: forming a fermentation culture medium containing an assimilable source of carbon, inorganic salt, and nitrogen; the nitrogen content of said medium being in excess of 2.5 mg./ml. culture medium; and cultivating under aerobic conditions an erythromycin-producing strain of *Streptomyces erythreus* therein to form a substantial amount of erythromycin B in the said culture medium.

2. A method substantially as described in claim 1 wherein the culture medium contains a lipid in an amount between about 0.25% and 6.0% based on the volume of the said culture medium.

3. A method of producing an erythromycin B-containing fermentation broth having a major proportion of erythromycin B therein which comprises: forming a fermentation culture medium containing an assimilable source of carbon, inorganic salt, and nitrogen; the nitrogen content of said medium being between about 2.5 and 4.5 mg./ml. culture medium; and cultivating under aerobic conditions an erythromycin-producing strain of *Streptomyces erythreus* therein to form a substantial amount of erythromycin B in the said culture medium.

4. A method substantially as described in claim 3 wherein the culture medium contains a lipid in an amount between about 0.25% and 6.0% based on the volume of the said culture medium.

5. A method of producing an erythromycin B-containing fermentation broth having a major proportion of erythromycin B therein without detectable amounts of erythromycin C which comprises: forming a fermentation culture medium containing an assimilable source of carbon, inorganic salt, and nitrogen; the nitrogen content of said culture medium being in excess of about 3.5 mg. nitrogen per ml. culture medium; and cultivating under aerobic conditions an erythromycin-producing strain of *Streptomyces erythreus* therein to form a substantial amount of erythromycin B without a detectable amount of erythromycin C.

6. A method substantially as described in claim 5 wherein the culture medium contains a lipid in an amount between about 0.25% and 6.0% based on the volume of the said culture medium.

7. A method of producing the antibiotic erythromycin B which comprises: forming a fermentation culture medium containing an assimilable source of carbon, inorganic salt, and nitrogen; the nitrogen content of said medium being in excess of 2.5 mg./ml. culture medium; cultivating under aerobic conditions an erythromycin-producing strain of *Streptomyces erythreus* therein to form a substantial amount of erythromycin B in said culture medium; and recovering the said erythromycin B from said culture medium.

8. A method substantially as described in claim 7 wherein the culture medium contains a lipid in an amount between about 0.25% and 6.0% based on the volume of said culture medium.

9. A method of producing the antibiotic erythromycin B which comprises: forming a fermentation culture medium containing an assimilable source of carbon, inorganic salt, and nitrogen; the nitrogen content of said medium being between about 2.5 and 4.5 mg./ml. culture medium; cultivating under aerobic conditions an erythromycin-producing strain of *Streptomyces erythreus* therein to form a substantial amount of erythromycin B in said culture medium; and recovering the erythromycin B from said culture medium.

10. A method substantially as described in claim 9 wherein the culture medium contains a lipid in an amount between about 0.25% and 6.0% based on the volume of the said culture medium.

11. A method of producing the antibiotic erythromycin B without the co-presence of erythromycin C which comprises: forming a fermentation culture medium containing an assimilable source of carbon, inorganic salt, and nitrogen; the nitrogen content of said culture medium being between about 3.5 and 4.5 mg. nitrogen per ml. culture medium; cultivating under aerobic conditions an erythromycin-producing strain of *Streptomyces erythreus* therein to form a substantial amount of erythromycin B without the co-presence of erythromycin C; and recovering the erythromycin B from the said culture medium.

12. A method substantially as described in claim 11 wherein the culture medium contains a lipid in an amount between about 0.25% and 6.0% based on the volume of the said culture medium.

References Cited in the file of this patent

UNITED STATES PATENTS 2,653,899 Bunch et al.  Sept. 29, 1953

FOREIGN PATENTS 679,097 Great Britain  Sept. 10, 1952

OTHER REFERENCES

Pettinga et al.: 76 J. A. C. S., January 20, 1954, pp. 569–571.

Flynn: Jour. Am. Chem. Soc., 76, June 20, 1954, pp. 3121 to 3131.